United States Patent [15] 3,671,774

Millman [45] June 20, 1972

[54] ZERO RECOVERY TIME TWO TRANSISTOR MULTIVIBRATOR

[72] Inventor: Sidney E. Millman, Van Nuys, Calif.

[73] Assignee: TRW Inc., Redondo Beach, Calif.

[22] Filed: Dec. 28, 1970

[21] Appl. No.: 101,809

[52] U.S. Cl. ....................307/273, 328/207, 331/113

[51] Int. Cl. ....................H03k 3/26, H03k 3/10

[58] Field of Search ....................307/273; 328/207; 331/113

[56] References Cited

UNITED STATES PATENTS

| | | | |
|---|---|---|---|
| 2,837,663 | 6/1958 | Walz | 307/273 |
| 2,880,330 | 3/1959 | Linvill et al. | 307/273 |
| 3,171,978 | 3/1965 | Weber | 307/273 X |
| 3,184,604 | 5/1965 | Hale | 307/273 X |
| 3,222,550 | 12/1965 | Willard et al. | 307/273 X |
| 3,313,955 | 4/1967 | Brisay, Jr. | 307/273 X |
| 3,089,962 | 5/1963 | Foote | 307/273 |
| 3,097,313 | 7/1963 | Rywak | 307/273 |
| 3,107,309 | 10/1963 | Hitt | 307/273 |
| 3,274,399 | 9/1966 | Sheng | 307/273 |

OTHER PUBLICATIONS

Pub. I " Electronic Circuit Design Handbook" by Editors of EEE Magazine, Sec. 5, Pulse Circuits, pp. 69 and 72.

*Primary Examiner*—Stanley D. Miller, Jr.
*Attorney*—Daniel T. Anderson, Harry I. Jacobs and Alfons Valukonis

[57] ABSTRACT

An improved two transistor monostable multivibrator having an extremely short retrigger time is disclosed. Recovery to the stable state is initiated by the abrupt removal of base current from the normally "off" transistor which causes that transistor to come out of saturation and revert back to its blocking state so that the circuit subsequently regenerates back to its stable state. Simultaneously, the normally "on" transistor saturates and the timing capacitor discharges via a very low impedance path. The discharge through the very low impedance path is responsible for the extremely fast retrigger time. Conversion of the multivibrator from monostable to astable operation is also disclosed.

9 Claims, 3 Drawing Figures

Sidney E. Millman
INVENTOR.

BY [signature]

ATTORNEY

Sidney E. Millman
INVENTOR.
BY
ATTORNEY

ZERO RECOVERY TIME TWO TRANSISTOR MULTIVIBRATOR

BACKGROUND OF THE INVENTION

Conventional monostable multivibrator circuits are well known in the art of triggered circuits and are frequently referred to as one-shot circuits. In triggered circuits of the one-shot type, the quiescent point of the monostable mode of operation is in one of the stable regions. When a one-shot circuit is triggered by an external pulse, its operating point is moved from the normally stable region to a temporarily stable region. The time constant of the circuit elements holds the operating point in the temporarily stable region for a finite period of time. The operating point then moves back to the original, normally stable region.

A conventional one-shot may consist of a two-transistor circuit with regenerative interdependent biasing networks, such that the circuit is stable with the same transistor always saturated (normally "on") and the remaining transistor always non-conducting (normally "off"). By one of a variety of popular triggering methods, one of the transistors is induced to change conduction states. This effect is coupled to the other transistor and regeneration causes both to change states rapidly, and remain in this configuration according to certain resistance-capacitance time constants. In these conventional one-shot circuits the recovery to the stable state is always affected by a charging capacitor causing the normally "on" transistor to revert back to its conducting state. In addition a time period, which is relatively long with respect to the switching times of the transistors, is required to reset the necessary RC networks prior to retriggering, in order to obtain equal successive timed intervals.

For many pulse and switching circuit applications, the retrigger time of the one-shot circuit should be very short. In order to minimize the retrigger time, some prior art devices include an additional transistor stage. The additional transistor stage increases the cost of a one-shot circuit.

It would be desirable to have an extremely fast retrigger time one-shot circuit utilizing only two transistors.

SUMMARY

In accordance with an example of a preferred embodiment of the present invention, a two-transistor one-shot circuit is provided wherein recovery to the stable state is not affected by a charging capacitor causing the normally "on" transistor to revert back to its conducting state. Recovery to the stable state is initiated by the abrupt removal of base current from the normally "off" transistor which causes that transistor to revert back to its blocking state.

Therefore, an extremely fast retrigger time occurs because at the conclusion of the one-shot timed interval, both terminals of an interval determining capacitor are clamped through saturated low impedance semiconductors to ground potential. The short time constant resulting from the low semiconductor impedances in combination with the interval determining capacitor provides the extremely short retrigger time.

DESCRIPTION OF THE PREFERRED EMBODIMENTS

Figure 1:
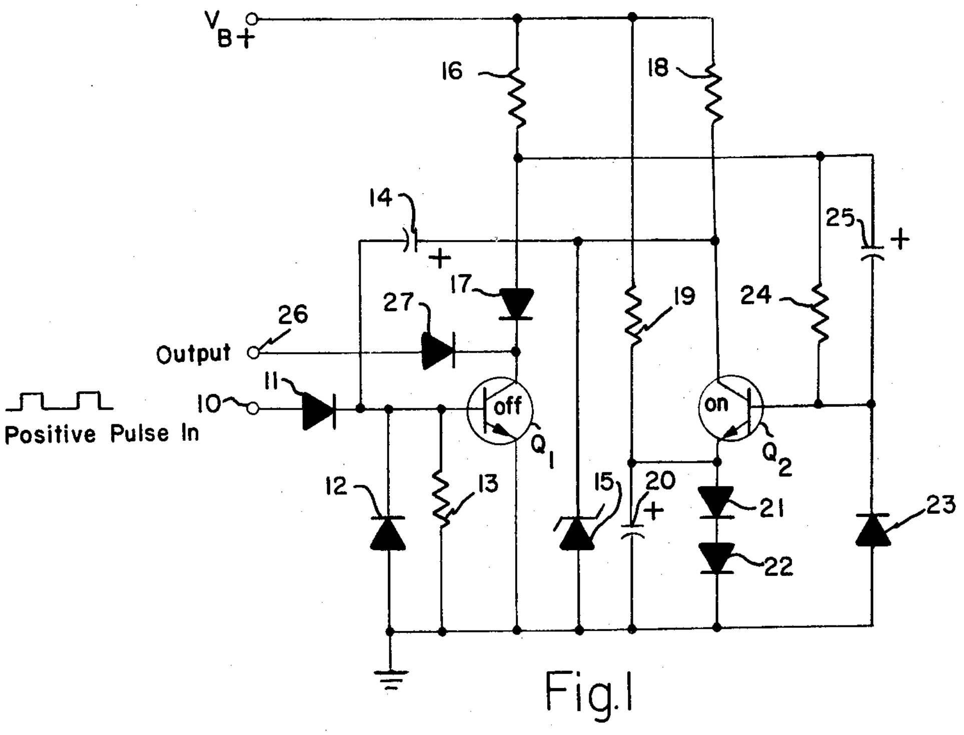
FIG. 1 is a schematic circuit diagram showing a monostable multivibrator in accordance with the present invention.

Referring to FIG. 1, a transistor Q1, having a base, emitter and collector is biased so that it is normally "off" and a transistor Q2, having a base, emitter and collector is biased so that it is normally "on." Triggering pulses may be received by the circuit at input 10, as shown in FIG. 1, and transmitted to the base of transistor Q1 via diode 11. It should be noted that negative triggering pulses may be applied to the base of transistor Q2 through a suitable diode. See FIG. 3. The emitter of transistor Q1 is grounded. A flyback diode 12 is connected between the emitter and base of transistor Q1. A resistor 13 is placed in parallel with said flyback diode 12. An interval determining capacitor 14 is connected between the base of transistor Q1 and the collector of transistor Q2. A zener diode 15 is connected between the collector of transistor Q2 and ground.

A source of bias potential $V_{B+}$ is applied to the collector of transistor Q1 via biasing resistor 16 and diode 17. Biasing current for transistor Q2 is supplied via resistor 18 from $V_{B+}$ to the collector of transistor Q2 and via resistor 19 from $V_{B+}$ to the emitter of transistor Q2. A capacitor 20 is connected between the emitter of transistor Q2 and ground. The series combination of diodes 21 and 22 is connected across capacitor 20. A flyback diode 23 is connected between ground and the base of transistor Q2. The parallel combination of resistor 24 and capacitor 25 is connected between the base of transistor Q2 and the juncture of resistor 16 and diode 17. The output, 26, of the circuit of FIG. 1 is taken via diode 27 from the collector of transistor Q1.

It should be noted that the circuit of FIG. 1 may be simplified by removing capacitor 20, diode 23, resistor 24, capacitor 25 and connecting the juncture of resistor 16 and diode 17 to the base of transistor Q2.

Figure 2:
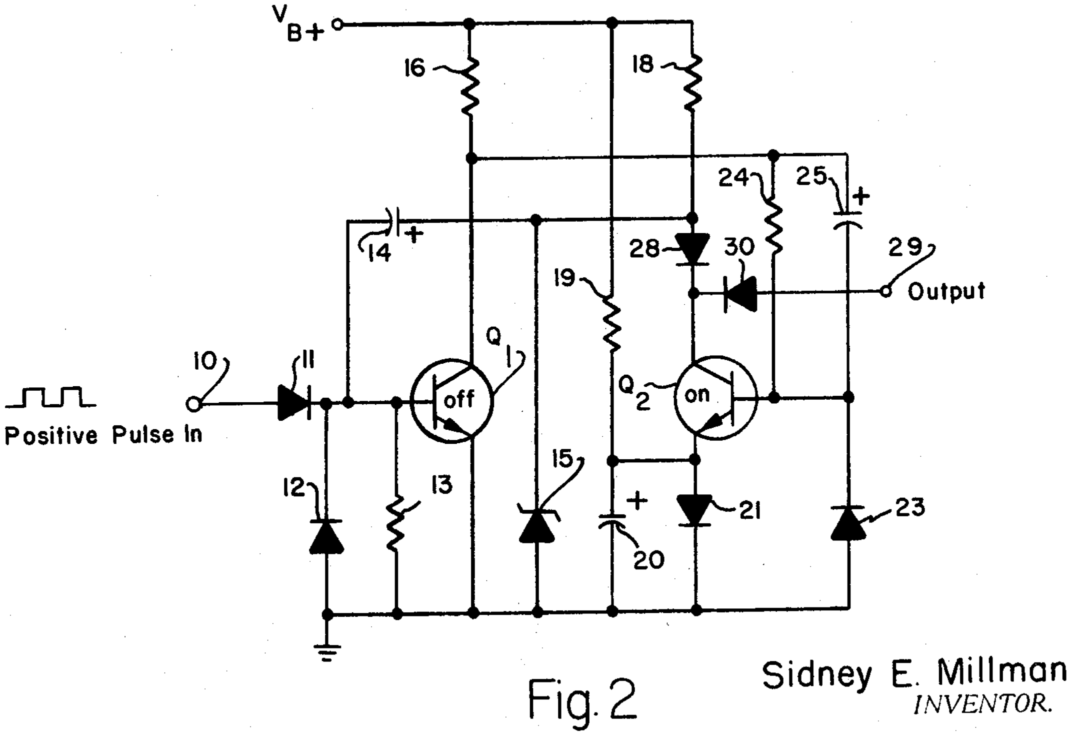
FIG. 2 shows the monostable multivibrator of FIG. 1 having an output via the normally "on" transistor.

The circuit of FIG. 2 is essentially the same as that shown in FIG. 1 with the exception that diodes 17, 22 and 27 and output 26 are eliminated. A diode 28 is inserted between the collector of transistor Q2 and the juncture of capacitor 14, zener 15 and resistor 18. The output is at 29 and is taken via diode 30 from the collector of transistor Q2.

Figure 3:
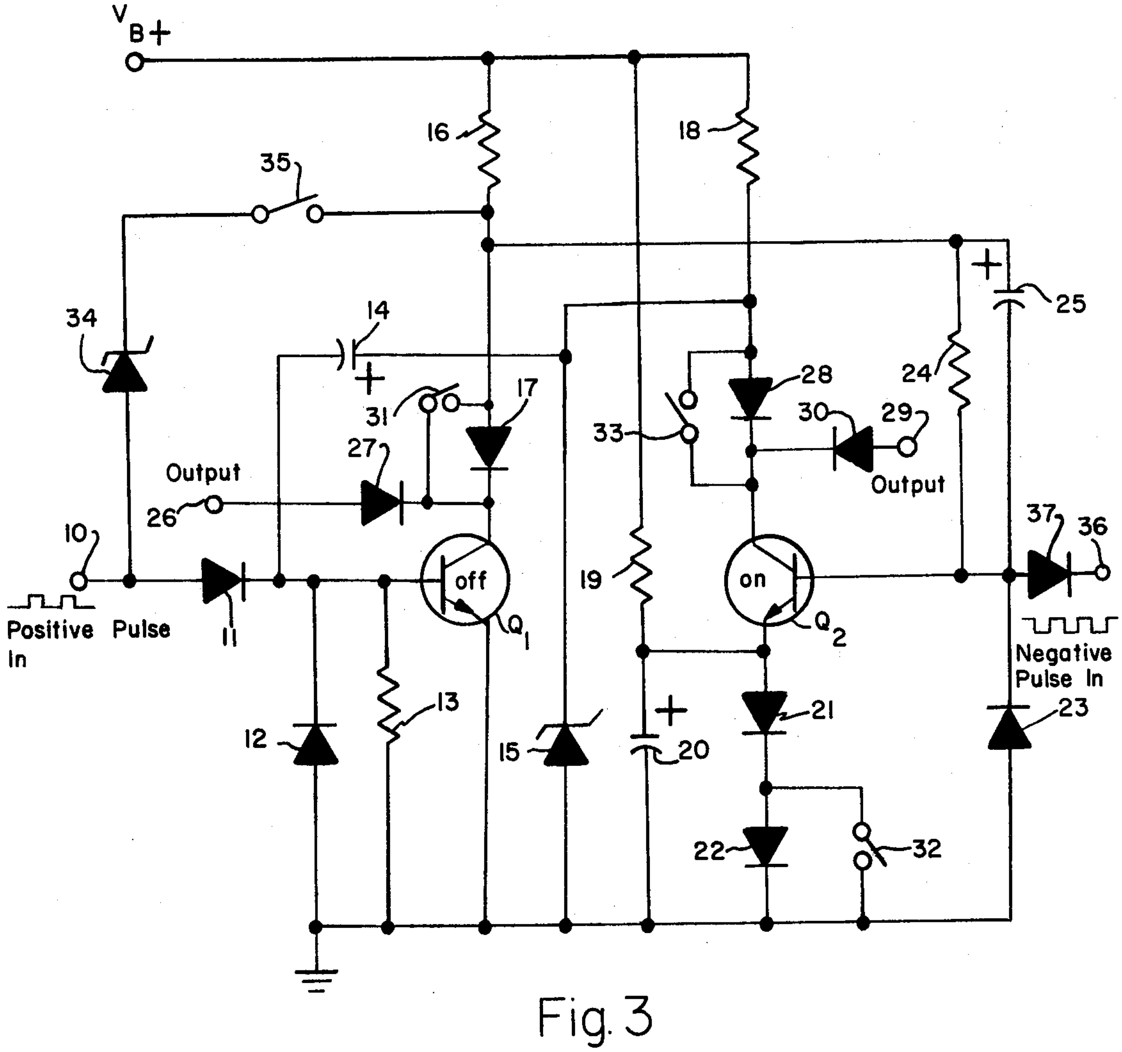
FIG. 3 shows the circuit of the present invention configured to operate as an astable multivibrator.

FIG. 3 includes all of the components if FIGS. 1 and 2 and additionally includes a switch 31 to short out diode 17, a switch 32 to short out diode 22, a switch 33 to short out diode 28, and a second zener diode 34 connected between input 10 and the juncture of resistor 16 and diode 17 by a switch 35 to convert the circuit to astable operation upon closure of switch 35. Provision is also made to receive negative triggering pulses via input 36 and diode 37 to the base of transistor Q2.

The operation of the monostable multivibrator of the present invention is explained as follows with reference to FIG. 1. Transistor Q2 is biased to be normally saturated ('-'on") and transistor Q1 is biased normally blocking ("off"). Saturation of transistor Q2 occurs as follows. Current is injected into the base of transistor Q2 via resistor 16 and resistor 24. This causes transistor Q2 to saturate and bring its collector voltage near ground. Note that there is no direct current path to the base of transistor Q1. Resistor 13 is included between the base and emitter of transistor Q1 to shunt transistor Q1 collector to base leakage current to ground around its base-emitter junction. Transistor Q1 is therefore maintained "off." At this time capacitor 25 is charged to approximately $V_{B+}$, as divided by the series combination of resistor 16 and resistor 24, in the polarity shown, capacitor 14 is essentially discharged, and zener diode 15 is in its blocking state.

When a positive trigger pulse is applied at 10, via diode 11, and injected into the base of Q1, the collector voltage of transistor Q1 begins to fall. This voltage change is propagated to the base of transistor Q2 via the parallel combination of resistor 24 and capacitor 25, thereby causing transistor Q2 to come out of saturation. The collector voltage of transistor Q2 then rises causing current to be injected into the base of transistor Q1 via resistor 18 and capacitor 14. This process regenerates rapidly until transistor Q1 is saturated and transistor Q2 is "off." As long as transistor Q1 is saturated, the base emitter junction of transistor Q2 is reverse biased via the series combination of diodes 21 and 22, and transistor Q1 collector-emitter path and diode 17. This permits transistor Q2 to be locked "off" independent of the state of charge on capacitor 25.

At this point, capacitor 25 is essentially discharged as the positive terminal of capacitor 25 is clamped to ground by transistor Q1, and the negative terminal of capacitor 25 is clamped to ground by either diode 23 or the series combination of transistor Q2 base-emitter junction, and diodes 21 and 22. Simultaneously capacitor 14 is charging towards $V_{B+}$ in the polarity shown via resistor 18.

Neglecting the small current in resistor 13, it will be noted that the charging current in capacitor 14 returns to ground via the base-emitter junction of transistor Q1. This maintains transistor Q1 saturated, and the circuit will remain in this configuration until the voltage at the positive terminal of capacitor 14 has reached the breakdown voltage of zener diode 15. At breakdown, base drive currents for transistor Q1 will be abruptly removed causing transistor Q1 to come out of saturation and the monostable multivibrator will regenerate back to its stable state. When transistor Q2 has again saturated, capacitor 14 is discharged simultaneously via the low impedance path of transistor Q2 collector-emitter, diodes 21, 22 and 12. At this time the circuit is immediately ready to accept a new trigger pulse.

The period of the monostable multivibrator is exclusively controlled by the magnitude of $V_{B+}$, resistor 18, zener diode 15 and capacitor 14. The time constant is controlled by the combination of resistor 18 and capacitor 14. The minimum base drive current for transistor Q1 can be calculated by taking the difference of $V_{B+}$ and $V_Z$, divided by the value of resistor 18, where $V_Z$ is the breakdown voltage of zener diode 15.

If $V_Z$ is chosen to be approximately 0.6 $V_{B+}$, the period of the circuit will be the RC time constant of resistor 18 and capacitor 14. When the voltage across zener diode 15 charges to $V_Z$, and zener diode 15 consequently breaks down, base drive current is immediately removed from transistor $Q_1$ causing the collector voltage of transistor Q1 to rise rapidly and couple through capacitor 25 to the base of transistor Q2. This causes transistors $Q_2$ to turn on and saturate, and rapidly discharge capacitor 14 through the semiconductor path of transistor $Q_2$ and diodes 21, 22 and 12. This rapid discharge of capacitor 14 permits the exceedingly fast retrigger time of the present invention. Hence a circuit with an extremely fast retrigger time is disclosed.

FIG. 2, as briefly stated before, shows a monostable multivibrator according to the present invention modified to have an output at the normally "on" transistor Q2. For this case diodes 17 and 27 are eliminated and the output 29 is taken via diode 30 at the collector of transistor Q2.

FIG. 3 shows a circuit according to the present invention modified to operate in an astable mode. Astable operation is accomplished by connecting zener diode 34 from input 10 to the collector of transistor Q1 or the anode of diode 17, as required. During operation of the circuit, at the time of recovery to the stable state, capacitor 25 is essentially discharged and begins to charge towards $V_{B+}$ in the polarity shown via resistor 16. When the positive terminal of capacitor 25 charges to the breakdown voltage of zener diode 34, transistor Q1 is retriggered. Hence, astable or free running operation occurs.

Therefore, the duration of one state will be a function of $V_{B+}$, capacitor 14, resistor 18 and the breakdown voltage of zener diode 15, and the duration of the opposite state will be a function of $V_{B+}$, capacitor 25, resistors 16 and 24, and the breakdown voltage of zener diode 34. Hence an astable multivibrator is disclosed in accordance with the present invention.

As shown in FIG. 3, when switch 33 is closed, shorting out diode 28, the output may be taken at 26 via diode 27. Similarly when switches 31 and 32 are closed, shorting out diodes 17 and 22 respectively, the output is taken at 29.

A second input terminal 36 via diode 37 is also shown in FIG. 3. This terminal may be used for monostable operation when negative triggering pulses are used. When a negative triggering pulse is used, transistor Q2 is turned "off" directly and transistor Q1 is turned "on" by regenerative action. When zener diode 15 breaks down, the base drive to transistor Q1 is removed, and the operation of the circuit proceeds as described above.

What is claimed is:

1. A multivibrator comprising:
a first transistor having a base, emitter and collector;
a second transistor having a base, emitter and collector;
means for grounding the emitter of said first transistor;
a first resistor connected between ground and the base of said first transistor;
a first diode shunted across said first resistor;
a source of bias potential;
a second resistor connected in series with a second diode, the free end of said second resistor connected to said source of bias potential, and the free end of said second diode connected to the collector of said first transistor;
a first capacitor connected between the base of said first transistor and the collector of said second transistor;
a third resistor connected between said source of of bias potential and the collector of said second transistor;
a first zener diode connected between ground and the collector of said second transistor;
means for connecting the base of said second transistor to the juncture of said second resistor and second diode;
a fourth resistor connected between said source of bias potential and the emitter of said second transistor;
a third diode connected between ground and the emitter of said second transistor;
means for applying positive triggering pulses to the base of said first transistor; and
means for receiving output pulses from the collector of said first transistor.

2. A multivibrator as claimed in claim 1 and further including:
means for applying negative triggering pulses to the base of said second transistor.

3. A multivibrator as claimed in claim 1 and further including:
a fourth diode interposed between the collector of said second transistor and the juncture of said first capacitor and third resistor; and
means for receiving output pulses from the collector of said second transistor.

4. A multivibrator as claimed in claim 1 and further including:
a second zener diode connected between the input to the base of said first transistor and the juncture of said second resistor and second diode;
a fifth resistor interposed between the base of said second transistor and the juncture of said second resistor and second diode;
a second capacitor shunted across said fifth resistor;
a fifth diode connected between ground and the base of said second transistor; and
a third capacitor shunted across said third diode; whereby said multivibrator is astable.

5. A two transistor multivibrator driven by a single source of bias voltage comprising:
first and second transistors, each transistor having a base, emitter and collector;
a single source of bias voltage connected to the collectors of said first and second transistors, and to the base of said second transistor, so that said first transistor is biased to be normally "off," and said second transistor is based to be normally "on;"
means for grounding the emitters of said first and second transistors;
the base of said first transistor receiving a train of positive triggering pulses;
means for saturating said first transistor and means for blocking said second transistor for a predetermined interval of time in response to receipt of a positive triggering pulse by said first transistor;

said means for holding said first transistor saturated for a predetermined interval of time comprising:

a first capacitor connected between the base of said first transistor and the collector of said second transistor, a first resistor connected between a source of biasing potential and the collector of said second transistor, and a first zener diode connected between the collector of said second transistor and ground, whereby current flows through said first resistor charging said first capacitor, and thus providing base drive to said first transistor, until the breakdown voltage of said first zener diode is reached the time interval from said triggering pulse to the time of breakdown of said zener diode being said predetermined interval of time; and means for abruptly removing the base drive from said first transistor and simultaneously returning said second transistor to said normally "on" state at the end of said predetermined interval of time; whereby said multivibrator may be retriggered immediately upon expiration of said predetermined interval of time.

6. A multivibrator as claimed in claim 5 wherein said second transistor is biased "on" by a circuit comprising:

a source of biasing potential; and a second resistor connecting the source of biasing potential to the base of said second transistor.

7. A multivibrator as claimed in claim 6 wherein said means for saturating said first transistor and means for blocking said second transistor for a predetermined interval of time includes:

means for saturating said first transistor in response to one of said positive triggering pulses;

means for holding said first transistor saturated for a predetermined interval of time;

means for blocking said second transistor in response to the saturation of said first transistor; and means for keeping said first transistor saturated as long as said second transistor is blocked.

8. A multivibrator as claimed in claim 6 wherein said means for abruptly removing the base drive from said first transistor and simultaneously returning said second transistor to said normally "off" state at the end of said predetermined interval of time includes:

means for removing the base drive to said first transistor, said base drive flowing through said first capacitor, in response to the sudden conduction of said first zener diode, said first transistor thereby returning to a blocking state; and means for saturating said second transistor in response to the blocking state of said first transistor.

9. A multivibrator as claimed in claim 8 and further including:

a fifth resistor interposed between the base of said second transistor and said second resistor;

means for connecting the juncture of said fifth resistor and said second resistor to the collector of said first transistor;

a second zener diode connected between the input to the base of said first transistor and the collector of said first transistor;

a second capacitor shunted across said fifth resistor;

a fifth diode connected between ground and the base of said second transistor; and a third capacitor shunted across said third diode; whereby said multivibrator is astable.

* * * * *